US007330426B2

(12) United States Patent
Berzosa et al.

(10) Patent No.: US 7,330,426 B2
(45) Date of Patent: Feb. 12, 2008

(54) RECEIVER-BASED RTT MEASUREMENT IN TCP

(75) Inventors: Fernando Berzosa, Darmstadt (DE); Rolf Hakenberg, Darmstadt (DE); Thomas Klinner, Aschaffenburg (DE); Carsten Burmeister, Hamburg (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 967 days.

(21) Appl. No.: 10/418,298

(22) Filed: Apr. 18, 2003

(65) Prior Publication Data
US 2003/0231636 A1    Dec. 18, 2003

(30) Foreign Application Priority Data
Jun. 18, 2002  (EP)  ................... 02013311

(51) Int. Cl.
  H04L 12/26    (2006.01)
(52) U.S. Cl. .................. 370/229; 370/230; 370/252
(58) Field of Classification Search ............ 370/229, 370/230, 235, 236, 252, 253, 468
  See application file for complete search history.

(56) References Cited

U.S. PATENT DOCUMENTS

| 6,560,243 B1 * | 5/2003 | Mogul ................ 370/468 |
| 6,622,172 B1 * | 9/2003 | Tam .................. 709/232 |
| 6,745,361 B1 | 6/2004 | Gradischnig |
| 6,754,228 B1 * | 6/2004 | Ludwig ............... 370/468 |
| 6,757,255 B1 * | 6/2004 | Aoki et al. ........... 370/252 |
| 7,035,214 B1 * | 4/2006 | Seddigh et al. ........ 370/231 |
| 2002/0154600 A1 * | 10/2002 | Ido et al. ............ 370/216 |
| 2002/0181494 A1 * | 12/2002 | Rhee ................. 370/465 |

FOREIGN PATENT DOCUMENTS

| EP | 0948168 | 10/1999 |
| EP | 1077559 | 2/2001 |
| WO | 0205496 | 1/2002 |

OTHER PUBLICATIONS

M. Allman, et al.; "On Estimating End-to-End Network Path Properties", Computer Communications Review, Association for Computing Machinery, New York, US, Oct. 1999, pp. 263-274, XP000852204, ISBN: 0146-4833.*
Chinese Office Action dated Nov. 12, 2004, with English translation.
European Search Report dated Dec. 2, 2002.

(Continued)

Primary Examiner—King Y. Poon
Assistant Examiner—Peter L Cheng
(74) Attorney, Agent, or Firm—Stevens, Davis, Miller & Mosher, LLP (57) ABSTRACT

A method of performing Round Trip Time (RTT) measurement in a data packet receiver using a Transmission Control Protocol (TCP) for communication via a network with a sender, said method comprising the steps of sending an acknowledgement for a currently received data packet to the sender, measuring a first time instant when sending the acknowledgement, triggering at the sender the transmission of an expected data-packet, measuring a second time instant when the expected data packet is received, and calculating the round-trip time based on the measured first and second time instants.

8 Claims, 6 Drawing Sheets

OTHER PUBLICATIONS

M. Allman, et al.; "On Estimating End-to-End Network Path Properties," Computer Communications Review, Association for Computing Machinery, New York, US, Oct. 1999, pp. 263-274, XP000852204, ISBN: 0146-4833.

I. T. Ming-Chit, et al.; "Improving TCP Performance Over Asymmetric Networks," Computer Communication Review, ACM, vol. 30, No. 3, Jul. 2000, pp. 45-54, XP002223255, USA, ISSN: 0146-4833.

* cited by examiner

RECEIVER-BASED RTT MEASUREMENT IN TCP

FIELD OF THE INVENTION

This invention relates to packet data transmissions, in particular transmission of data using the Transmission Control Protocol (TCP) over Internet Protocol (IP) networks. TCP provides stability of networks by its integrated congestion and flow control mechanisms. Further, information on TCP and IP networks are, for instance, available from U.S. Pat. No. 6,298,041 B1.

BACKGROUND ART

While the TCP sending rate is normally controlled by the sender, there are scenarios and environments, where the receiver has some knowledge of the used links and bit rates, which make it worthwhile to let the receiver control the data transmission rate of the sender to some extent. In order to apply this mechanism, the receiver should have knowledge of the Round Trip Time (RTT) value to control or limit the sender's bit rate. As a result, the sender would not have to probe for the available bit rate by itself, which normally comes to the expense of packet losses and is less accurate than the receiver's information.

The sending bit rate in the TCP sender is controlled by a sliding window called congestion window. The sender sends data and receives cumulative acknowledgements. Outstanding data is the data that the sender has already sent, but has not received acknowledgements for it. The sender is allowed to have the amount of outstanding data equal to the current value of the congestion window. Because the data is usually acknowledged one RTT after it was sent, the allowed sending bit rate, B_send can be calculated from the RTT and the congestion window size, cwnd, as: B_send=cwnd/RTT. An example of these typical values could be RTT=100 ms and B_send=64 Kbit/s.

The congestion window at the server is dynamically adjusted according to gathered network information, e.g. in cases of packet losses, the TCP sender would assume congestion in the network and deflate the window. In cases of no packet losses, the window is slightly and regularly increased. However, the window which TCP uses to control the sending of data packets, is the minimum of the congestion window and another window-size signalled by the receiver called the advertised window, awnd. This is usually used for the flow control features of TCP, i.e. to ensure that a fast TCP sender does not send more data than the receiver can consume.

In conclusion, the receiver can limit the upper sending rate of the sender of a TCP connection, by using the integrated flow control and send an advertised window with the value calculated from RTT and maximum sending bit rate.

If only one connection member has data to send, RTT measurements for the receiver in a TCP connection is only possible at the beginning of a connection (TCP starts with a 3-way handshake). The measurement, which the receiver can perform at connection setup, is not accurate, because it is based on small control packets (usually around 40 bytes). The data packets are much larger in size, e.g. 1500 bytes, and thus the RTT is usually much higher than for the small control packets.

Considering this, receivers can make a rough RTT measurement at connection set-up, but do not have further RTT information afterwards. As the RTT is usually dynamic and variable in IP networks, the receiver should collect RTT information more frequently to perform a reliable sending bit rate control at the sender.

As described above, the receiver in a TCP connection can control the sending bit rate of the sender by signalling an upper limit in form of the advertised window. However, in order to calculate an advertised window to be signalled, the receiver needs an RTT measurement. The better and more accurate the measurement is, the better is the window calculation and the better is the link usage after the sender adopted the window size.

SUMMARY OF THE INVENTION

The present invention provides a method of performing round-trip time (RTT) measurements in a data packet receiver in a fast and reliable manner as set forth in claim 1. Preferred embodiments of the method are subject to various dependent claims. According to the method of the present invention, the receiver determines the time interval between sending of an acknowledgement, which triggers transmission of a new data packet, and the time instant of receiving the triggered data packet. If this measurement mechanism is done an a regular basis, it provides the receiver with a fairly good estimation of the RTT.

BRIEF DESCRIPTION OF THE DRAWINGS

In the following, the invention will be described in further detail with reference to the accompanying drawing which show.

DETAILED DESCRIPTION OF THE EMBODIMENTS

A receiver having a TCP connection with a sender via a network can start an RTT measurement by sending an acknowledgement to the sender and waiting for receipt of a data packet triggered by this acknowledgement. However, the receiver should ensure that several requirements are fulfilled before starting the RTT measurement. In the following, several example requirements are described.

For the purpose of the following description, a data packet consists of a header having a typical length of 40 bytes, this header including a sequence number field which indicates the first data byte in this segment. This value can serve as an identifier for the data packet. A typical size for a TCP packet including header and data is 1500 bytes. Generally, it is understood by those skilled in the art that an acknowledgement contains the awnd value and the sequence number of the data packet which the sender of the acknowledgement is expecting to receive, this is known as the acknowledgement number.

Figure 1:
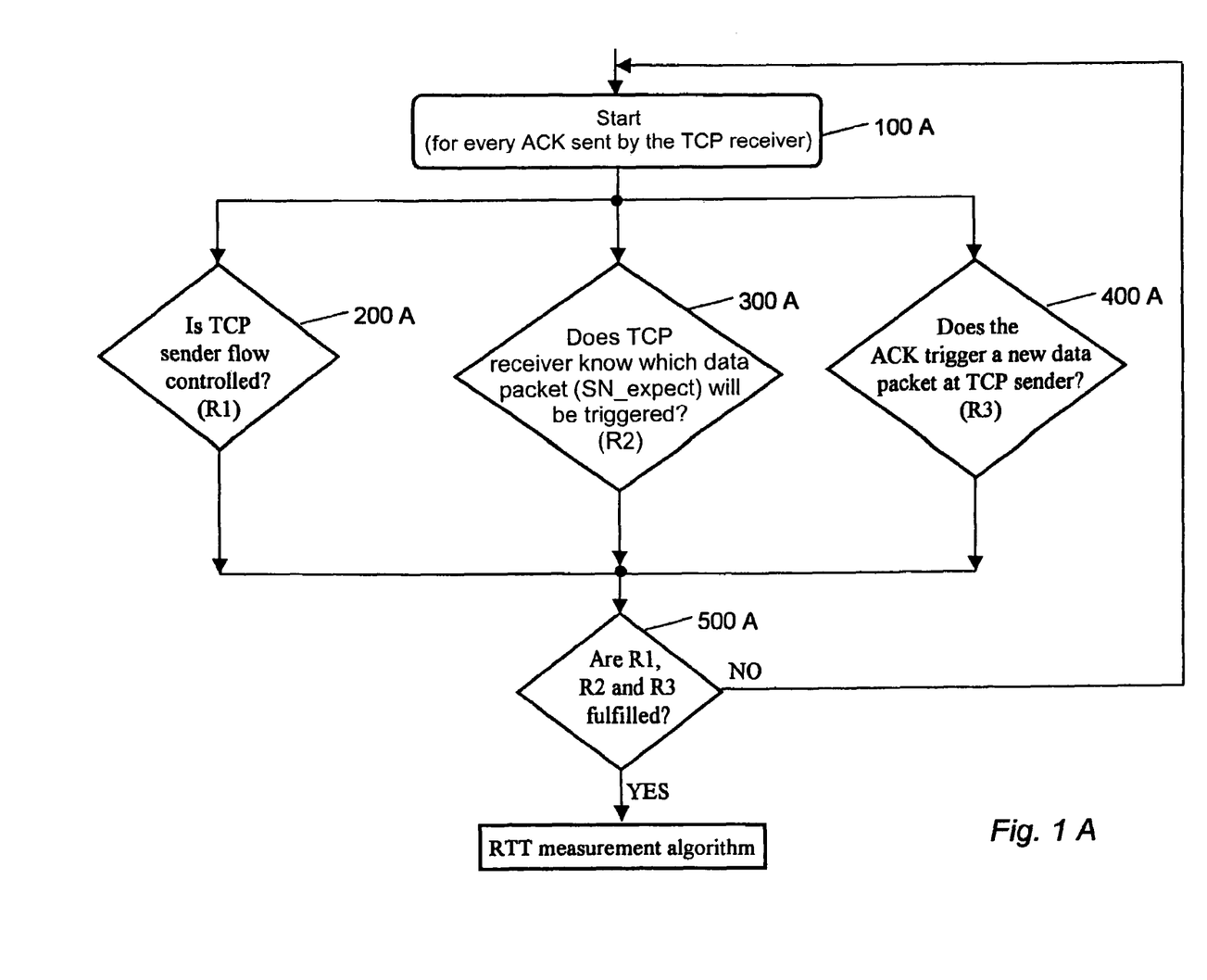
FIGS. 1A, 1B are flow charts illustrating several example requirements before starting the RTT measurement.
Figure 1B:
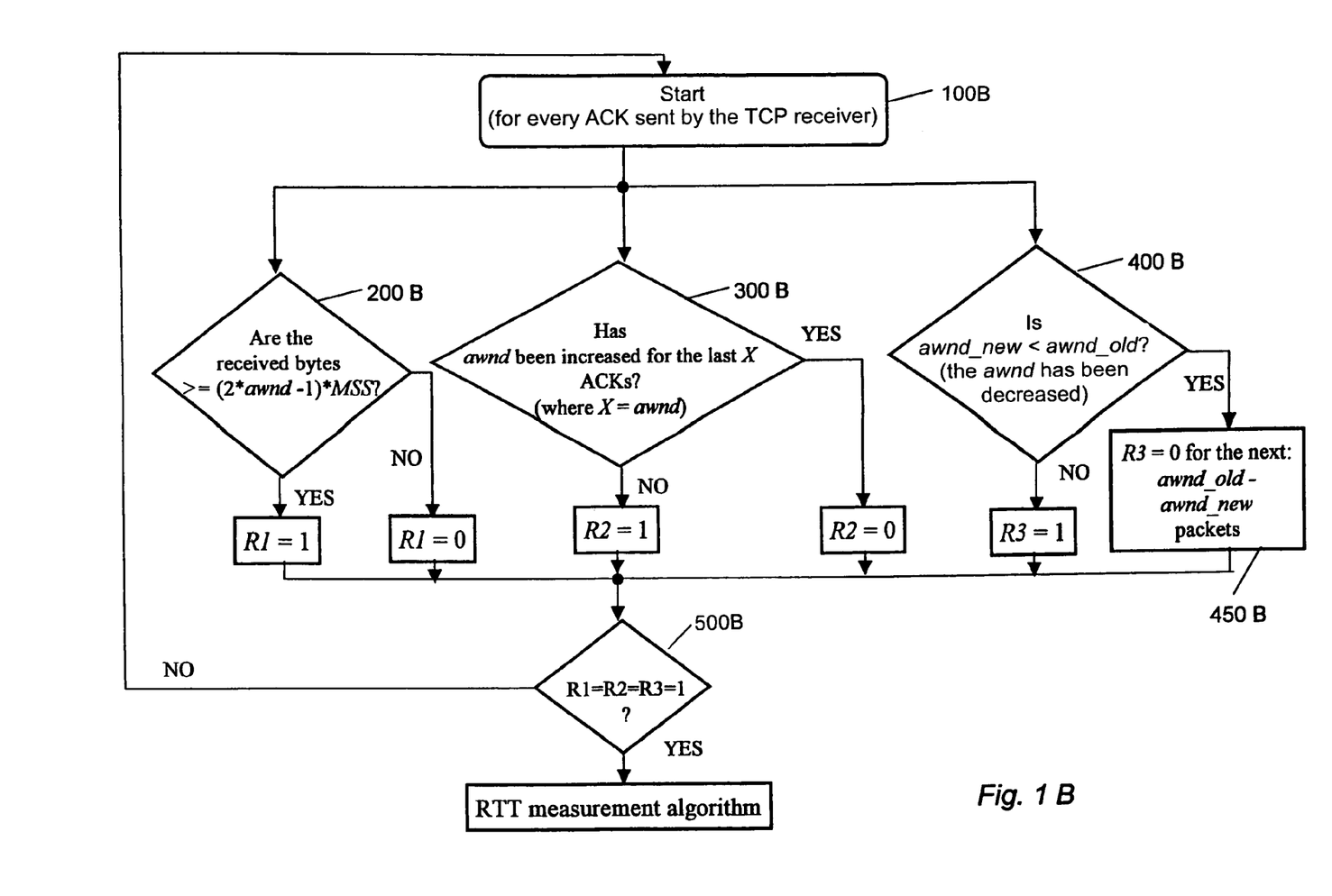

In the following, FIG. 1A illustrates the general requirements and FIG. 1B shows an implementation example. For the corresponding requirements, like numbers followed by the respective indication A or B have been chosen in order to facilitate the understanding.

As a first requirement R1 after start (step 100A in FIG. 1A and step 100B in FIG. 1B), the receiver has to ensure that the sender is flow controlled (by means of the advertised window awnd, see step 200A) and it is no longer in the TCP slow start phase. During TCP slow start phase, bursts of data packets occur and therefore the RTT measurement can be disturbed. A simple and conservative way of ensuring this requirement is to wait until several data packets are received. After an amount of 2*awnd−1 packets is sent (see 200B in FIG. 1B), either the sender's window reaches awnd or the sender has already reached congestion avoidance phase before that. Note that here and in the following description, the variable awnd is in units of segments, whereas in real TCP, the variables awnd and cwnd are in units of bytes.

For example if awnd has a value of 10 data segments, it can be assumed that the sender is no longer in the slow start phase after receiving 19 packets.

Figure 2:
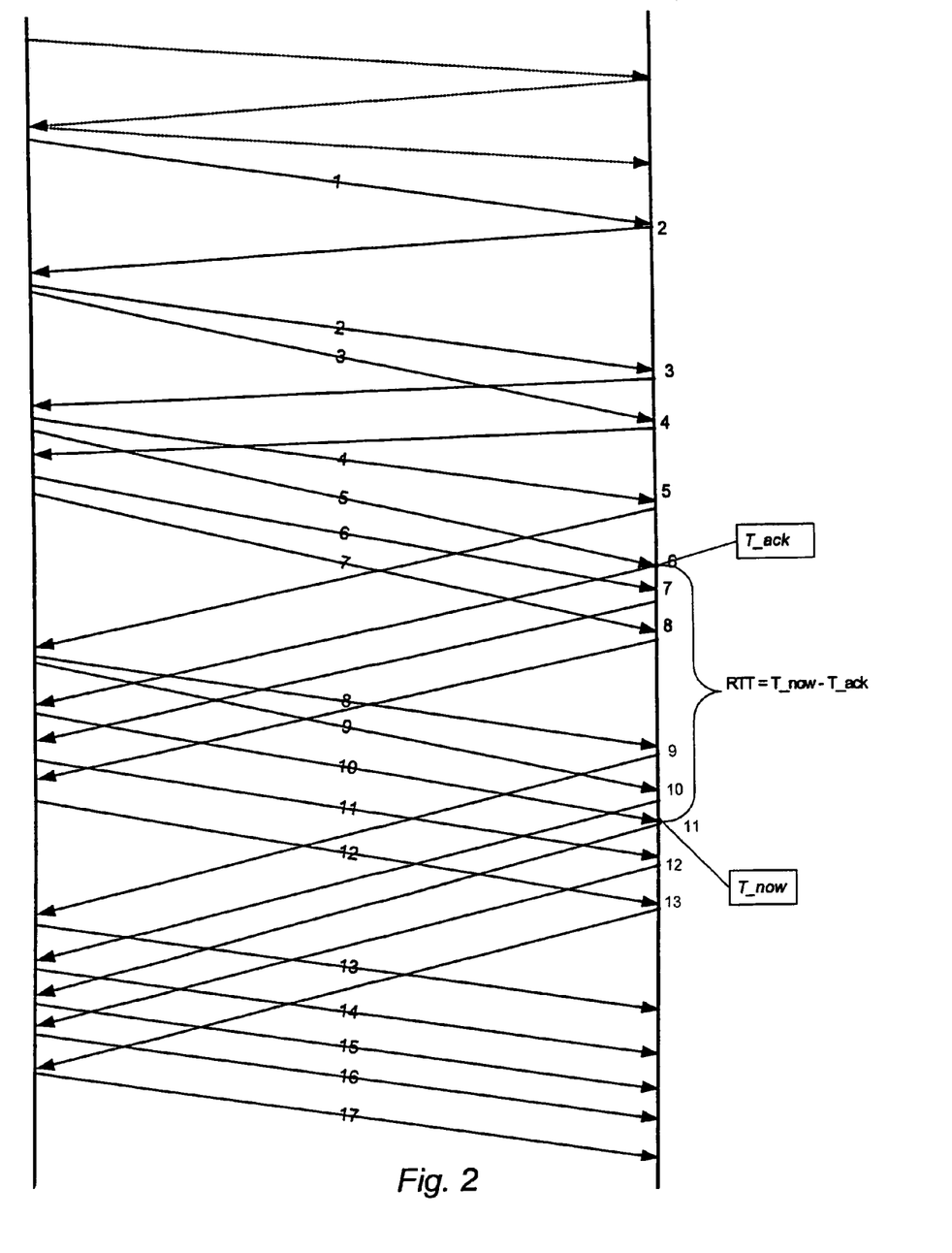
FIGS. 2-4 example transmissions of data packets from the sender to the receiver to illustrate several requirements before starting the RTT measurement, and FIG. 5 a flow chart of the RTT measurement according to the present invention.

In FIG. 2, this requirement is illustrated in an exemplary manner. In this case awnd=5 segments, the lines from left to right represent data packets from the sender to the receiver, the number in the middle being the sequence number (this is just an example since in reality sequence number, SN, is given in bytes). The numbers at on the right axis are the values of the sequence number contained in the acknowledament (SN_ack).

The Figure shows that waiting 2*awnd−1=2*5−1=9 packets (until packet with SN=10 arrives) coincides with the point at where the sender is flow-controlled. This means that every ACK packet only triggers one data packet at the sender. The first packet in the example for which this applies is packet number 10.

A second requirement R2 is that the receiver should be able to estimate the sequence number of the data packet the current acknowledgement is going to trigger at the sender. In other words, that the receiver is able to calculate the value of an expected sequence number, SN_expect (step 300A). This check succeeds if the advertised window awnd has not been increased for a predetermined number of packets (step 300B). A side effect of increasing the value of the advertised window is the possibility of having bursts of packets at the sender. This would also disturb the RTT measurement and erroneously increase its value.

Figure 3:
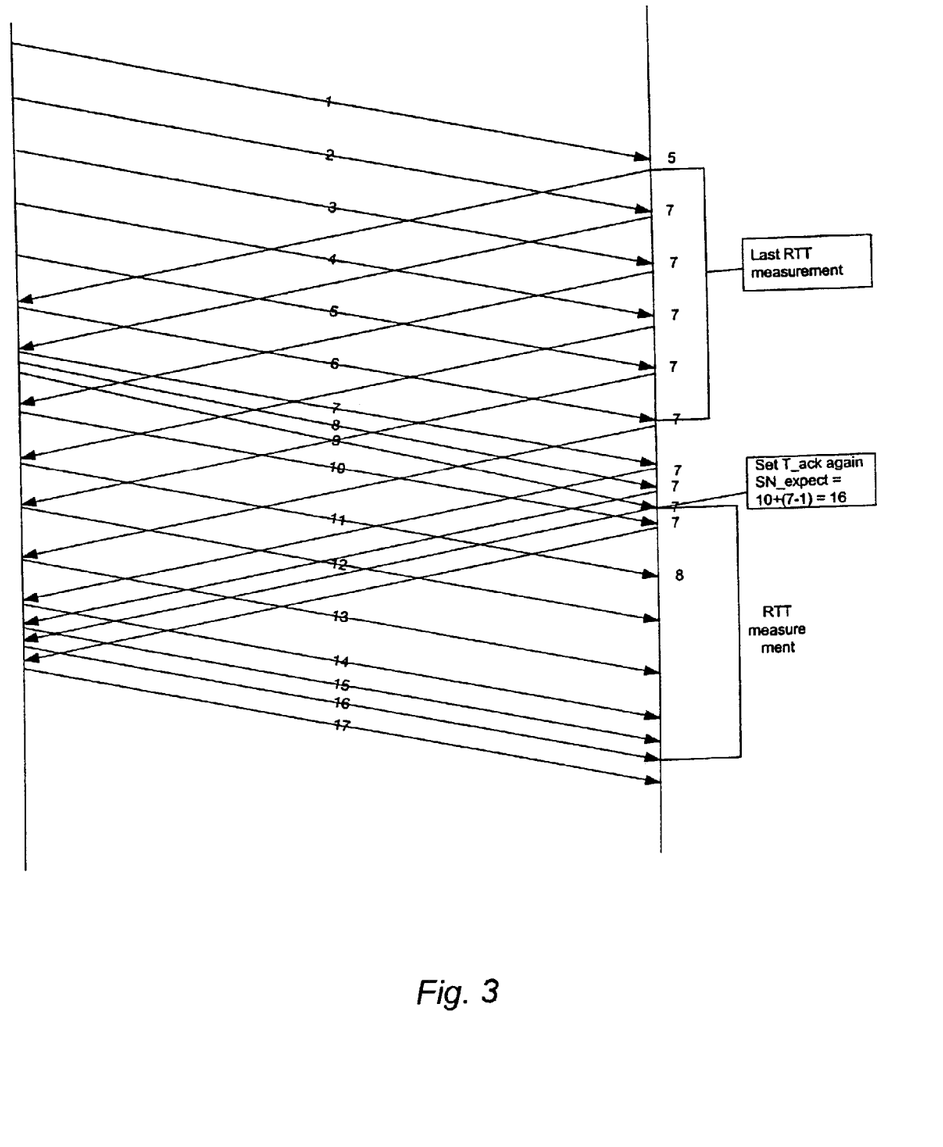

In FIG. 3 the awnd value changes from 5 to 7 and according to this requirement no RTT measurement can be started for the next 7 packets. The numbers at the right axis represent now the value of the awnd in number of packets. The reason is that the receiver is not able to determine the value of SN_expect. The Figure also shows the burst of packets transmitted by the sender, which might disturb this measurement due to higher processing times. These effects would not necessarily last for this number of X=awnd packets but is a safe limit.

A further query representing a third requirement R3 is performed to check whether the ACK triggers a new data packet at the TCP sender (step 400A). This means that a query is performed whether the awnd value has been decreased (step 400B) If so, no RTT measurement is possible for a predetermined number of next data packets. If there is a decrease, it is decided to wait for an additional number of (awnd_old-awnd_new) packets (step 450B).

Figure 4:
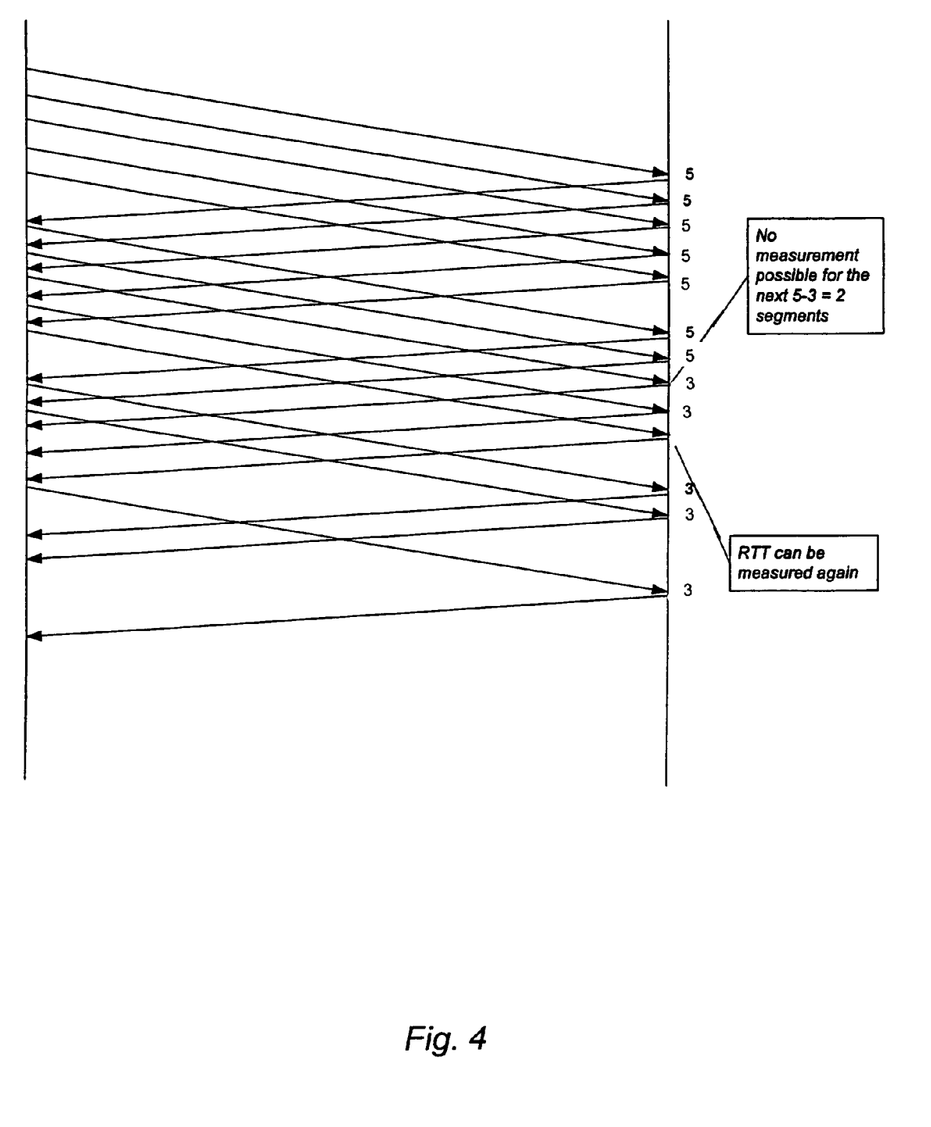

In the example illustrated in FIG. 4 the numbers at the right axis represent again the value of the awnd. At one point in time, this value changes from 5 to 3. This means that for 5−3=2 packets no RTT measurement can be started. The Figure shows clearly the reason since no new TCP packet is triggered due to the smaller window size until 2 new ACKs are received at the sender. Note that no RTT measurement can be started with the ACK when the requirements are not fulfilled. The incoming data packets can be used, though, for the RTT measurement which was started previously.

Figure 5:
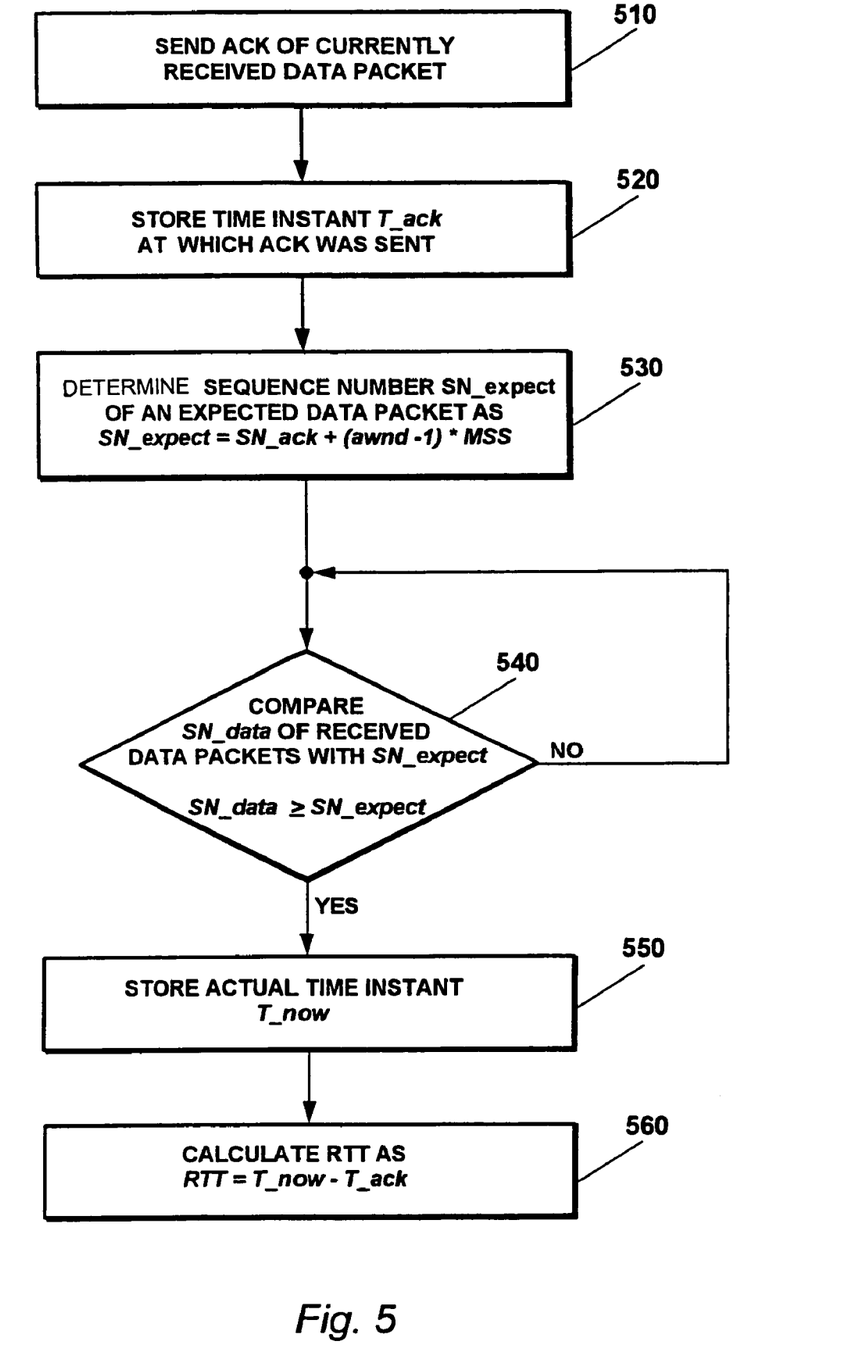

Only if all above-mentioned requirements R1-R3 are fulfilled, the receiver starts RTT measurement as indicated in step 500A, B with the current acknowledgement. For making an RTT measurement, the steps as illustrated in FIG. 5 are conducted.

In step 510, an acknowledgement of the currently received data packet is sent from the receiver to the sender. Further, as illustrated as step 520, the time instant T_ack, at which the acknowledgement was sent, is stored. In step 530, a sequence number SN_expect of an expected data packet is determined which indicates the sequence number of the first byte of the TCP data packet triggered by the current acknowledgement. The expected sequence number is calculated as follows:

$$SN\_expect=SN\_ack+(awnd-1)*MSS$$

where SN_ack is the acknowledgement number in the current acknowledgement and MSS denotes the maximum segment size in bytes.

In the receiver, in step 540, the sequence number of all data packets SN_data that are received after T_ack is compared according to the condition $$SN\_data \geq SN\_expect.$$

If this condition is not true, the receiver waits for the next received data packet if the condition is true, the next step 550 is performed wherein the actual time instant T_now is stored. In the next step 560, a calculation of RTT can be performed as $$RTT=T\_now-T\_ack.$$

Generally, RTT measurements described in the flowchart of FIG. 5 can be repeated as often as needed and as long as the requirements shown in FIGS. 1A and 1B are fulfilled.

The invention claimed is:

1. A method of performing Round Trip Time (RTT) measurement in a data packet receiver using a Transmission Control Protocol (TCP) for communication via a network with a sender, said method comprising the following steps:
    sending an acknowledgment for a currently received data packet to the sender,
    measuring a first time instant when sending the acknowledgment,
    triggering, in response to receiving acknowledgments, at the sender the transmission of further data packets,
    calculating a sequence number of an expected data packet on the basis of the sequence number of the currently acknowledged data packet SN_ack, an advertised window awnd and a maximum segment size MSS according to the formula:

$$SN\_expect=SN\_ack+(awnd-1)MSS,$$

comparing a sequence number of received data packets with the calculated sequence number of the expected data packet,
    measuring a second time instant when a data packet is received whose sequence number is equal to or larger than the calculated sequence number of the expected data packet, and
    calculating the RTT measurement based on the measured first and second time instants.

2. The method according to claim 1, wherein the RTT measurement is only performed when the sender is not in a slow start phase.

3. The method according to claim 1, wherein the RTT measurement is only performed when a flow control variable signaled from the receiver to the sender has been constant for a predetermined number of received data packets.

4. The method according to claim 1, wherein the receiver indicates an upper limit of a sending bit rate to the sender.

5. The method according to claim 4, wherein the sending bit rate is controlled by the size of the advertised window, which serves as a flow control command.

6. The method according to claim 4, wherein the sending bit rate is controlled by a dynamically varying congestion window.

7. The method according to claim 6, wherein the sending bit rate is controlled in accordance with the minimum of the congestion window and the advertised window as signaled by the receiver.

8. The method according to claim 1, wherein when the advertised window has been decreased, the RTT measurement is blocked until an additional number of data packets are received.

* * * * *